United States Patent
Mori et al.

(10) Patent No.: US 7,802,805 B2
(45) Date of Patent: Sep. 28, 2010

(54) STEERING DAMPER MOUNTING STRUCTURE FOR VEHICLE

(75) Inventors: Yotaro Mori, Saitama (JP); Tomohiro Fuse, Saitama (JP); Mikio Uchiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 520 days.

(21) Appl. No.: 11/892,482

(22) Filed: Aug. 23, 2007

(65) Prior Publication Data

US 2008/0054590 A1 Mar. 6, 2008

(30) Foreign Application Priority Data

Aug. 30, 2006 (JP) .............................. 2006-233966

(51) Int. Cl.
 *B62K 21/08* (2006.01)
(52) U.S. Cl. ....................................... 280/272; 280/271
(58) Field of Classification Search ................. 280/271, 280/272, 276, 89, 90
See application file for complete search history.

(56) References Cited

U.S. PATENT DOCUMENTS

| | | | | |
|---|---|---|---|---|
| 4,773,514 A * | 9/1988 | Gustafsson | ................. | 188/306 |
| 7,021,642 B2 * | 4/2006 | Sato et al. | ................... | 280/272 |
| 7,052,027 B2 * | 5/2006 | Gogo et al. | ................. | 280/272 |
| 7,306,248 B2 * | 12/2007 | Gogo et al. | ................. | 280/272 |
| 7,390,004 B2 * | 6/2008 | Gogo et al. | ................. | 280/272 |
| 2004/0145897 A1 * | 7/2004 | Felty | .......................... | 362/473 |
| 2004/0257821 A1 * | 12/2004 | Toyofuku | .................. | 362/475 |
| 2007/0045982 A1 * | 3/2007 | Tomonaga | .................. | 280/272 |
| 2007/0216124 A1 * | 9/2007 | Wakabayashi et al. | ........ | 280/89 |
| 2008/0054591 A1 * | 3/2008 | Fuse et al. | .................. | 280/272 |
| 2008/0238025 A1 * | 10/2008 | Mori | .......................... | 280/272 |

FOREIGN PATENT DOCUMENTS

JP 2005-96735 A 4/2005

* cited by examiner

*Primary Examiner*—Lesley Morris
*Assistant Examiner*—Marc A Scharich
(74) *Attorney, Agent, or Firm*—Birch, Stewart, Kolasch & Birch, LLP

(57) ABSTRACT

A steering damper mounting structure of a vehicle includes a head pipe, a front fork, a fork bridge, and a steering damper. The front fork, which suspends a front wheel, is steerably disposed on the head pipe. The fork bridge connects left and right members of the front fork. The steering damper is mounted on the fork bridge and the head pipe. The steering damper dampens a steering directional movement transmitted from a road surface to a handlebar via the front wheel and the front fork. A lower mounting portion on a side of the head pipe is disposed on a side of an axis as a center of pivotal motion of the front fork relative to the fork bridge, more specifically, an upper mounting portion on a side of the top bridge. The resulting configuration reduces the size of a front portion of a vehicle and a steering damper.

20 Claims, 10 Drawing Sheets

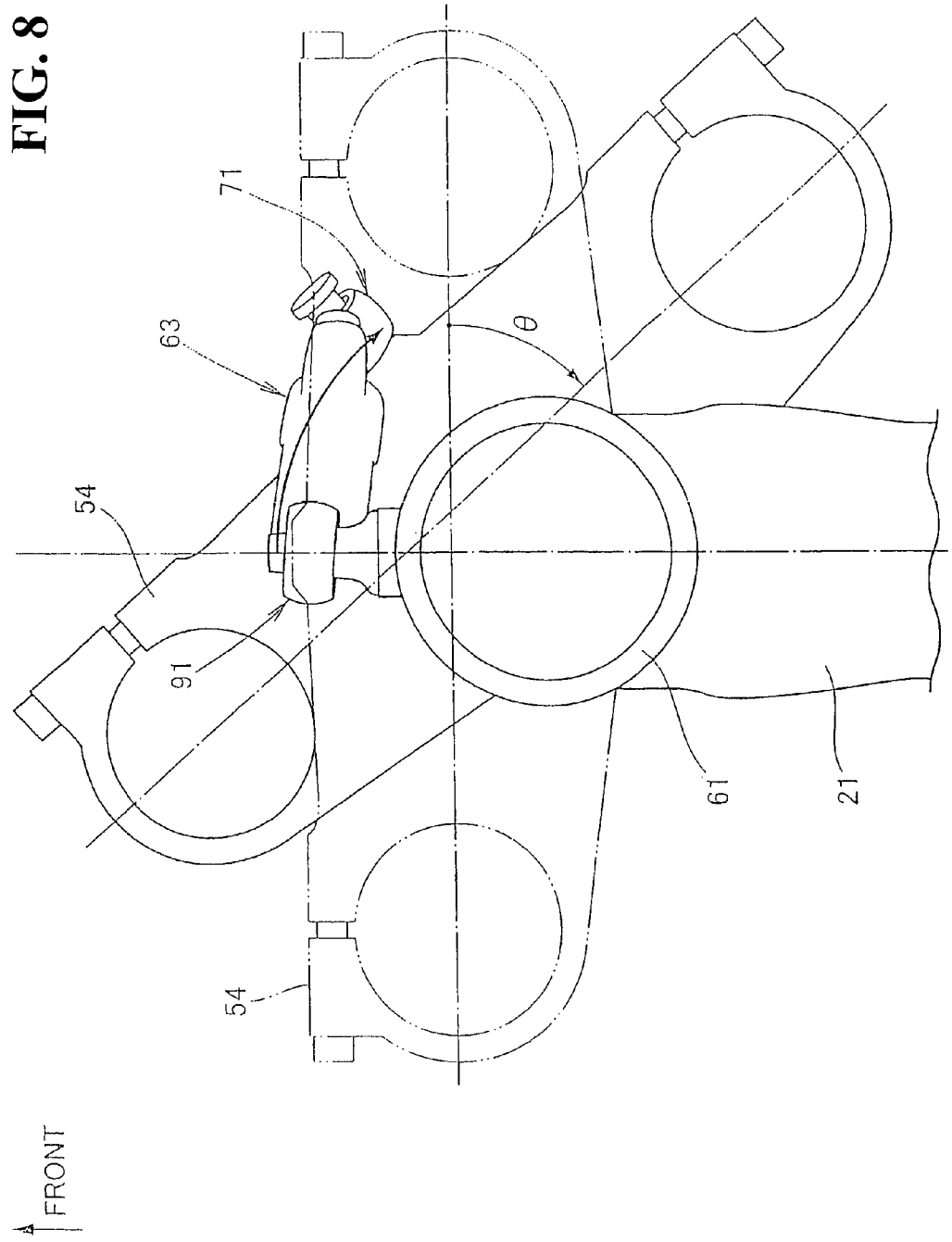

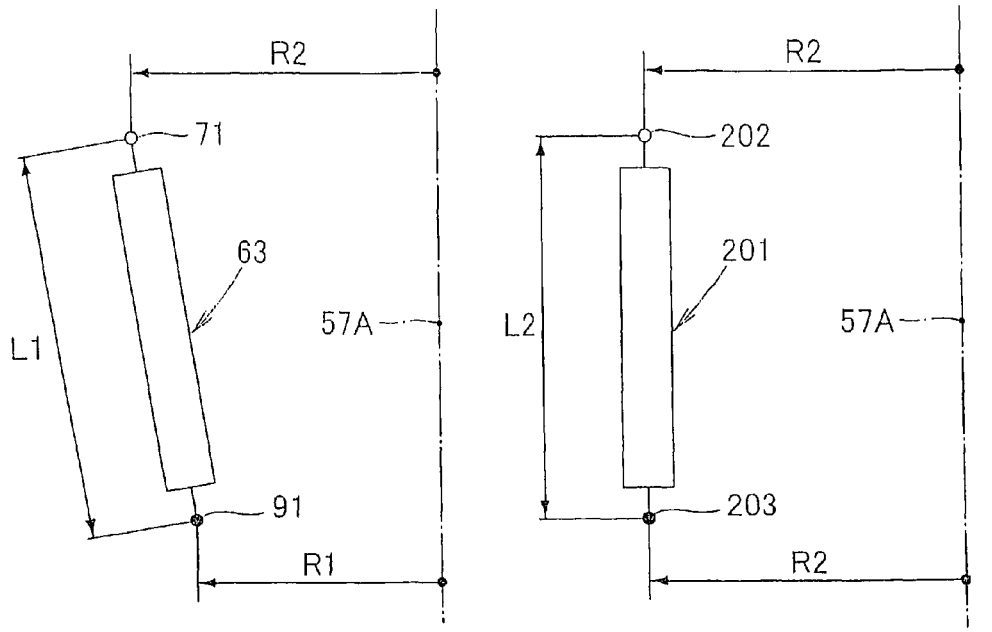
Embodiment FIG. 9(a)   Comparative Embodiment FIG. 9(c)
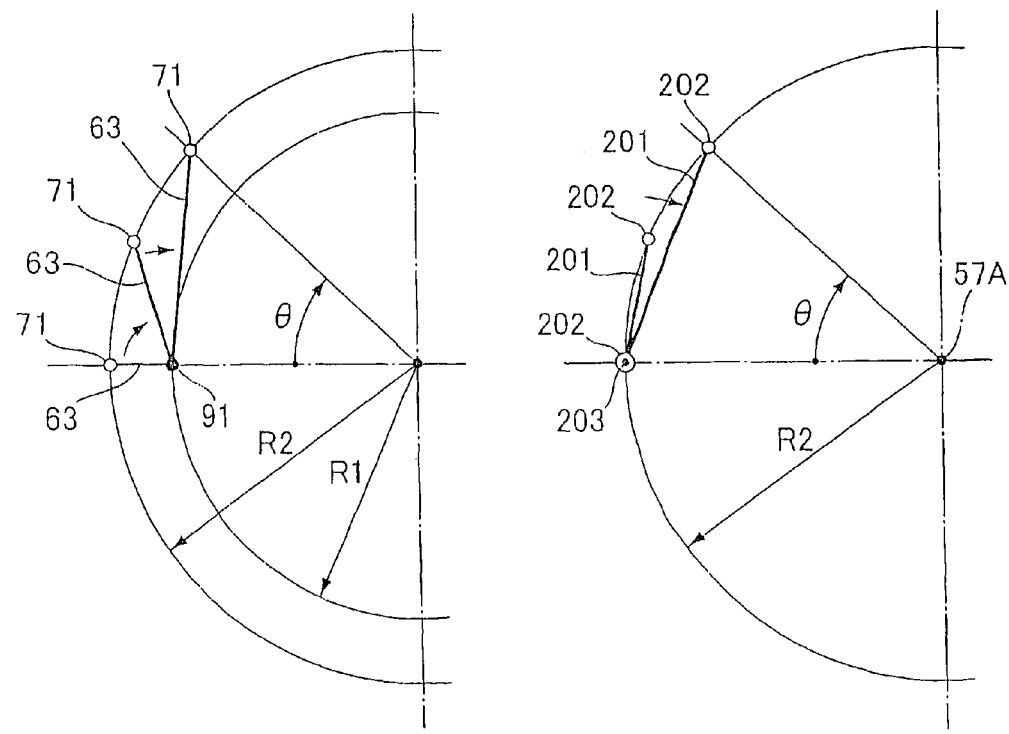
Embodiment FIG. 9(b)   Comparative Embodiment FIG. 9(d)

STEERING DAMPER MOUNTING STRUCTURE FOR VEHICLE

CROSS-REFERENCE TO RELATED APPLICATION

The present application claims priority under 35 U.S.C. §119 to Japanese Patent Application No. 2006-233966, filed Aug. 30, 2006, the entire contents of which are hereby incorporated by reference.

BACKGROUND OF THE INVENTION

1. Field of the Invention

The present invention relates to a vehicular steering damper mounting structure that dampens a steering directional movement transmitted from a road surface to a handlebar via a front wheel and a front fork.

2. Description of Background Art

A known vehicular steering damper mounting structure includes a steering damper disposed between a head pipe and a fork bridge on a side of a front fork and to extend in parallel with the head pipe (see, for example, Japanese Patent Laid-open No. 2005-96735).

The arrangement disclosed in FIGS. 1 and 2 of Japanese Patent Laid-open No. 2005-96735 will be described below.

A vehicle includes a head pipe 6h disposed at a front end of a vehicle body frame 6. A front fork 2 is steerably mounted to the head pipe 6h via a steering stem 5.

The front fork 2 includes left and right fork pipes 3, 3 connected by a fork bridge 4 including a top bridge 4a and a bottom bridge 4b. The fork pipes 3, 3 support a front wheel 1 via an axle. The steering stem 5 is mounted vertically across the top bridge 4a and the bottom bridge 4b. A handlebar 7 is fitted to the top bridge 4a.

Referring to FIGS. 2 and 3 of Japanese Patent Laid-open No. 2005-96735, a tubular damper 10 as the steering damper includes a damper case 11 and a damper rod 12 that slides inside the damper case 11. The damper case 11 has an end mounted to a stay 8 disposed on the head pipe 6h, while the damper rod 12 has an end mounted to a stay 9 disposed on the bottom bridge 4b. The tubular damper 10 is disposed forwardly of the head pipe 6h and the bottom bridge 4b.

When a handlebar steering angle is 0°, a central axis D1 of the tubular damper 10 is in parallel with a central axis S of the steering stem 5 and the head pipe 6h.

The bottom bridge 4b has a front surface disposed forwardly in the vehicle of the head pipe 6h. To dispose the central axis D1 of the tubular damper 10 in parallel with the central axis S of the head pipe 6h, it is necessary to protrude the stay 8 on the side of the head pipe 6h largely forwardly relative to the stay 9 on the side of the bottom bridge 4b. As a result, the entire tubular damper 10 protrudes largely forwardly from the head pipe 6h. This makes it necessary to allow a large space in areas around the head pipe 6h for the tubular damper 10 to pivot during steering by the handlebar 7. A front portion of the vehicle therefore becomes large.

In addition, the tubular damper 10 is largely away from the central axis S, about which the fork bridge 4 pivots. Consequently, when the portion of the tubular damper 10 mounted to the side of the bottom bridge 4b rotates during steering, the damper rod 12 strokes largely relative to the damper case 11 of the tubular damper 10. This results in a large-sized tubular damper 10.

SUMMARY AND OBJECTS OF THE INVENTION

It is an object of the present invention to improve the vehicular steering damper mounting structure and to promote reduction in the size of the front portion of the vehicle and the steering damper.

According to a first aspect of the present invention, there is provided a steering damper mounting structure of a vehicle. The vehicle includes a head pipe, a front fork, a fork bridge, and a steering damper. The head pipe forms part of a vehicle body. The front fork, which suspends a front wheel, is steerably disposed on the head pipe. The fork bridge connects a left member and a right member of the front fork. Further, the steering damper is disposed on the fork bridge and the head pipe. The steering damper dampens a steering directional movement transmitted from a road surface to a handlebar via the front wheel and the front fork. In this steering damper mounting structure, a portion on a side of the head pipe supporting the steering damper is disposed on a side of a center of pivotal motion of the front fork relative to a portion on a side of the fork bridge supporting the steering damper.

The arrangements according to the first aspect of the present invention achieve the following effects. Specifically, the portion on the side of the head pipe supporting the steering damper is brought toward the side of the center of pivotal motion of the front fork. This not only suppresses protrusion of the entire steering damper forward of the vehicle, but also makes small an amount of stroke of the steering damper.

According to a second aspect of the present invention, a mounting surface disposed on the fork bridge for mounting the steering damper on the fork bridge is formed to be in parallel with an axis of the steering damper when a handlebar steering angle is zero.

The foregoing arrangement achieves the following effect. Specifically, a pivotal motion range of the steering damper can be made even greater.

According to a third aspect of the present invention, the steering damper includes a main body having a cylinder, a piston movably inserted in the cylinder, and a rod disposed on the piston. Further, the main body is supported on the head pipe and the rod is supported on the fork bridge.

The arrangement according to the third aspect of the present invention achieves the following effect. Specifically, when the rod, which is lighter in weight than the main body accommodating the piston, rotates with the fork bridge, the rod generates an inertia force smaller than an inertia force produced when the main body rotates.

According to a fourth aspect of the present invention, the fork bridge includes a protrusion that contacts the main body to thereby prevent erroneous installation, in which the steering damper is installed invertedly between the head pipe and the fork bridge.

The arrangement according to the fourth aspect of the present invention achieves the following effect. Specifically, if the main body of the steering damper is mounted to the fork bridge or the rod of the steering damper is mounted to the head pipe, then the protrusion included in the fork bridge comes in contact with the main body, defying installation of the other end of the steering damper.

Effects of the Invention include the following:

In accordance with the first aspect of the present invention, the portion on the side of the head pipe supporting the steering damper is disposed on the side of the center of pivotal motion of the front fork relative to the portion on the side of the fork bridge supporting the steering damper. As compared with a case, in which the steering damper is disposed such that the axis thereof extends in parallel with the axis of the head pipe, protrusion of the entire steering damper forward of the vehicle can be suppressed and the space required for the steering damper to rotate becomes smaller. If, for example, a cover member covering the steering damper is disposed around the steering damper, the cover member is not largely away from the head pipe, thus promoting reduction in size of the front portion of the vehicle. Additionally, the smaller stroke of the steering damper contributes to a smaller steering damper.

In accordance with the second aspect of the present invention, the mounting surface disposed on the fork bridge for mounting the steering damper on the fork bridge is formed to be in parallel with the axis of the steering damper when the handlebar steering angle is zero. Accordingly, the pivotal motion range of the steering damper can be made even greater. The aspect of the present invention can therefore respond to a vehicle involving a large steering angle.

In accordance with the third aspect of the present invention, the steering damper includes the main body having a cylinder, the piston movably inserted in the cylinder, and the rod disposed on the piston. Further, the main body is supported on the head pipe and the rod is supported on the fork bridge. Specifically, the rod, which is lighter in weight than the main body accommodating the piston, is supported on the fork bridge. This arrangement helps make small the inertia force generated during rotation of the fork bridge, contributing to an improved steering feel felt via the handlebar.

In accordance with the fourth aspect of the present invention, the fork bridge includes the protrusion that contacts the main body to thereby prevent erroneous installation, in which the steering damper is installed invertedly between the head pipe and the fork bridge. The protrusion comes in contact with the main body if the main body of the steering damper is mounted to the fork bridge or the rod of the steering damper is mounted to the head pipe. Erroneous installation can thus be prevented with such a simple structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a view for illustrating a pivotal movement of the steering damper according to the embodiment of the present invention;

FIGS. 9($a$) through 9($d$) are views showing schematically mounting positions on, and pivotally moved postures of, both ends of the steering damper.

DETAILED DESCRIPTION OF THE PREFERRED EMBODIMENTS

Figure 1:
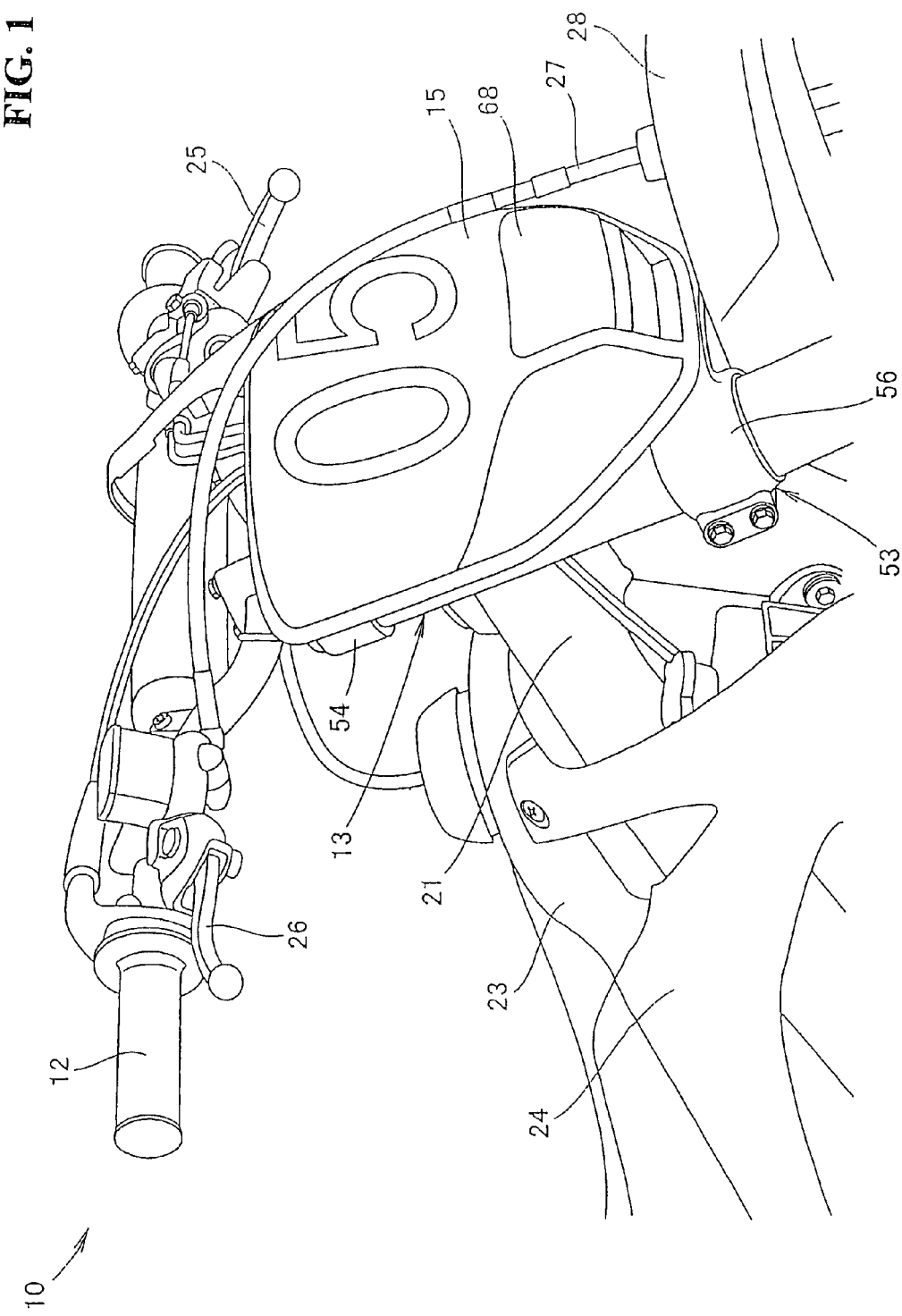
FIG. 1 is a perspective view showing a front portion of a vehicle having a steering damper according to an embodiment of the present invention.

FIG. 1 is a perspective view showing a front portion of a vehicle having a steering damper according to an embodiment of the present invention. A vehicle 10 is an off-road motorcycle. A handlebar 12 is fitted to an upper end of a front fork 13 that supports a front wheel at a lower end thereof. A steering damper (not shown) to be described in detail later is mounted on an upper portion of the front fork 13. A number plate 15 marked with a competition identification number is disposed so as to cover a forward area of the steering damper.

Referring to FIG. 1, reference numeral 21 represents a vehicle body frame serving as a framework for the vehicle 10. The front fork 13 is steerably mounted to a head pipe (not shown) disposed at a front end of the vehicle body frame 21.

FIG. 1 also shows a fuel tank 23 mounted at an upper portion of the vehicle body frame 21, a cowl 24 that covers a front side portion of a vehicle body, a clutch lever 25 and a front wheel brake lever 26, respectively, attached to the handlebar 12. A brake hose 27 transmits an operating force applied to the front wheel brake lever 26 to a brake caliper disposed on a side of the front wheel as brake hydraulic pressure. A front fender 28 covers an area upward of the front wheel.

Figure 2:
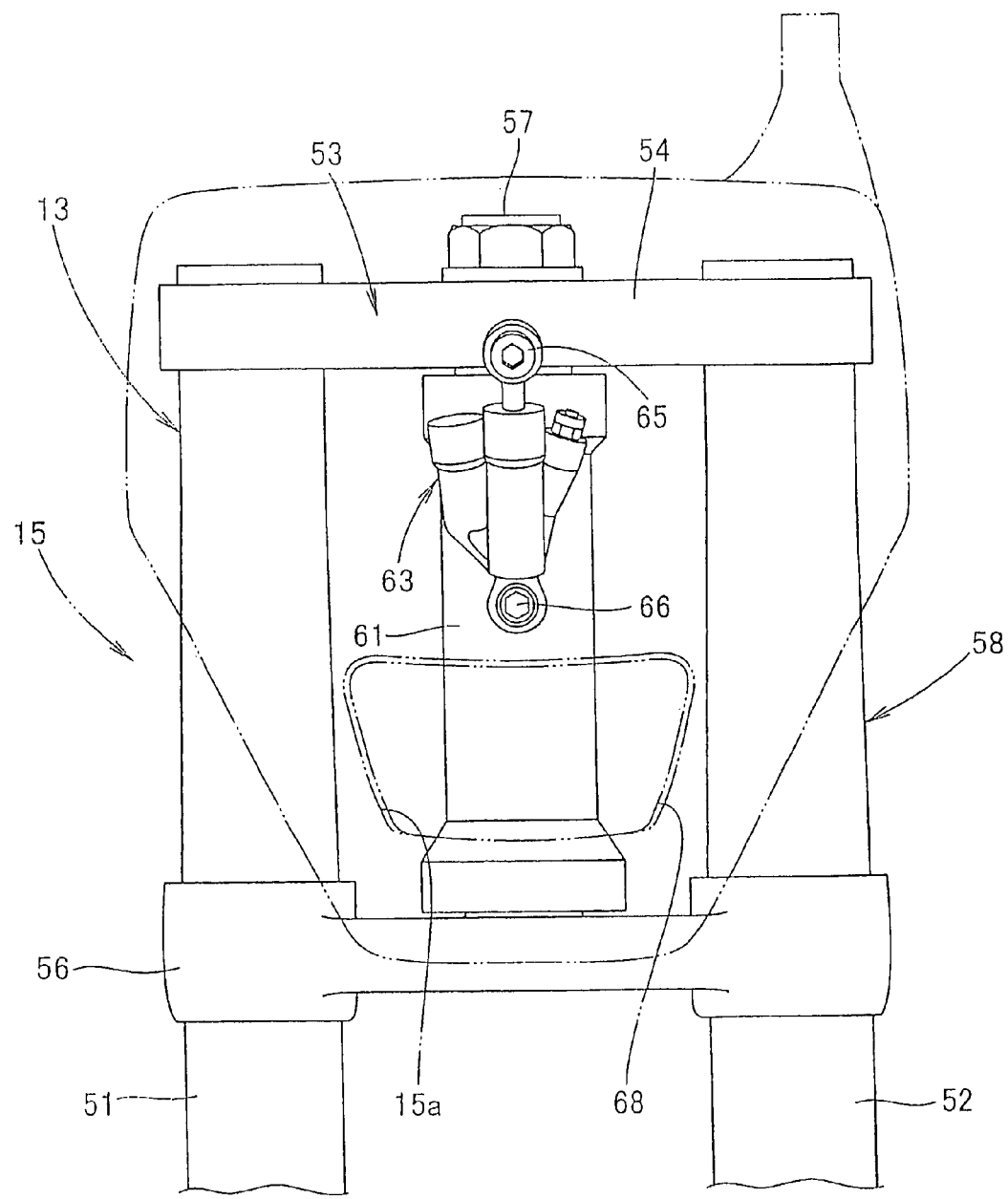
FIG. 2 is a view for illustrating the front portion of the vehicle according to the embodiment of the present invention.

FIG. 2 is a view for illustrating a front portion of the vehicle 10 according to the embodiment of the present invention. The front fork 13 includes a pair of left and right fork pipes 51, 52, a fork bridge 53, and a steering stem 57. The front wheel is mounted to lower ends of the fork pipes 51, 52 via an axle. The fork bridge 53 connects upper portions of the fork pipes 51, 52. The fork bridge 53 includes a top bridge 54 and a bottom bridge 56 formed of an aluminum alloy. The steering stem 57, which serves as a pivot, is extended across a central portion of each of the top bridge 54 and the bottom bridge 56.

The steering stem 57 is rotatably mounted on a head pipe 61 disposed at a front end of the vehicle body frame 21 (see FIG. 1).

The front fork 13, the handlebar 12 (see FIG. 1), and the head pipe 61 described above constitute a steering mechanism 58 for steering the front wheel.

A steering damper 63 is mounted with bolts 65, 66 between the head pipe 61 and the top bridge 54. The steering damper 63 serves as a shock absorber that lessens a steering directional force suddenly transmitted to the front fork 13 and the handlebar 12 from a road surface via the front wheel.

Figure 3:
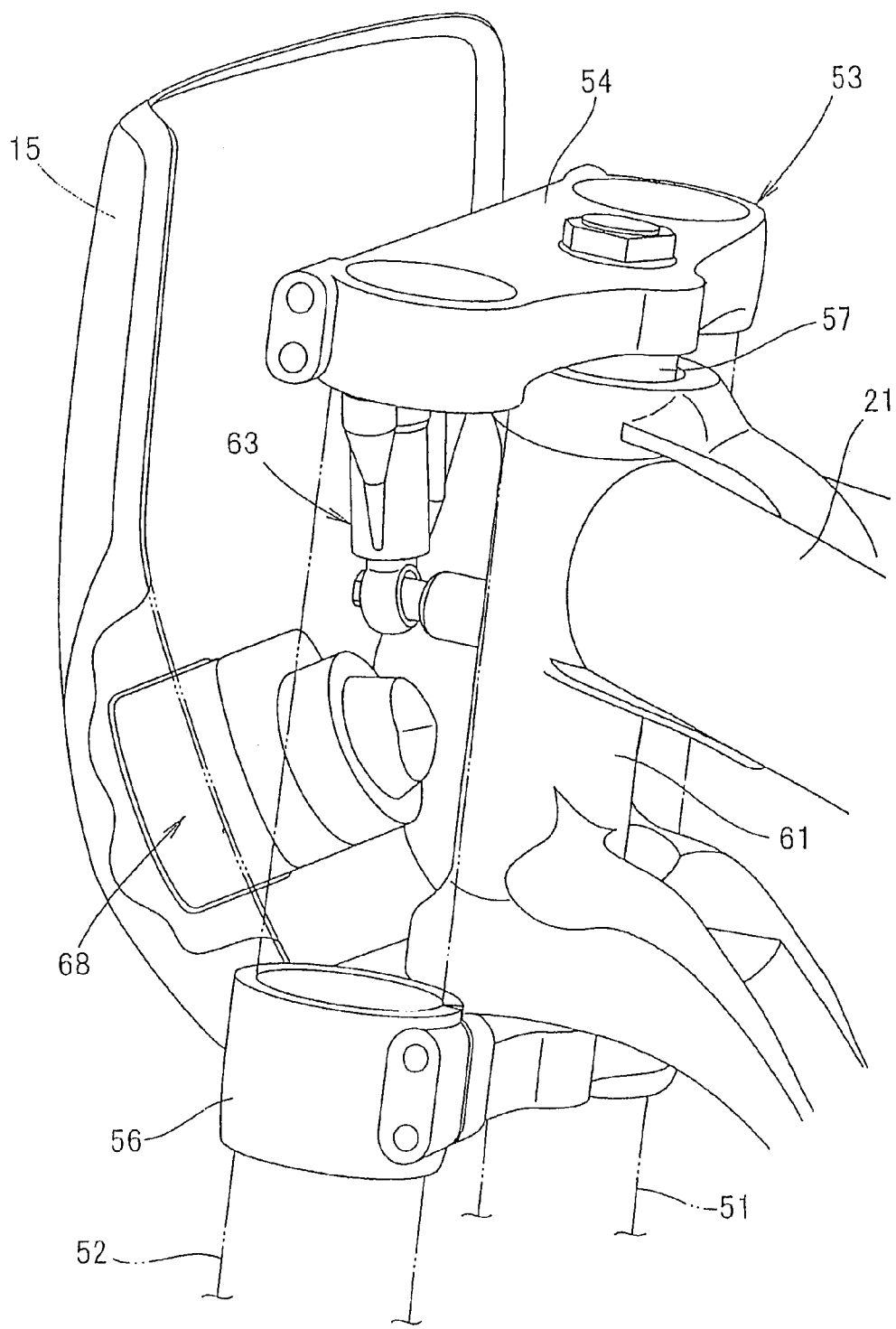
FIG. 3 is a perspective view showing the front portion of the vehicle according to the embodiment of the present invention.

FIG. 3 is a perspective view (an arrow FRONT in FIG. 3 indicates a forward direction of the vehicle; the same applies hereunder) showing the front portion of the vehicle 10 according to the embodiment of the present invention. FIG. 3 shows that a light unit 68 is disposed forwardly of the head pipe 61 and downwardly of the steering damper 63.

The light unit 68 is a lightweight competition lighting apparatus illuminating a road surface forward of the vehicle 10.

Being covered with the number plate 15 at front, the steering damper 63 can be protected from flying gravel or the like.

Figure 4:
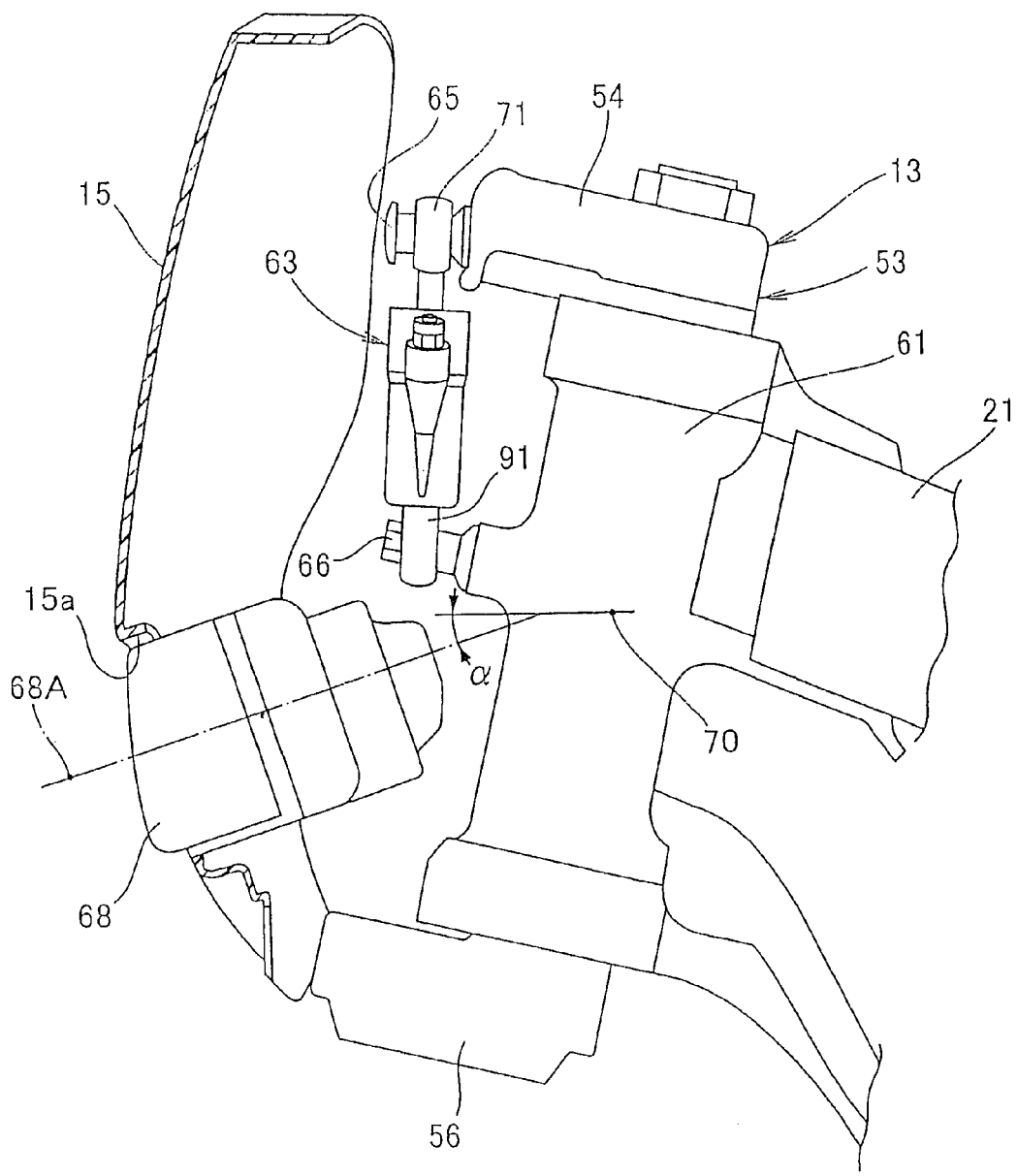
FIG. 4 is a side elevational view showing the front portion of the vehicle according to the embodiment of the present invention.

FIG. 4 is a side elevational view showing the front portion of the vehicle 10 according to the embodiment of the present invention. FIG. 4 shows the following arrangements, specifically: the steering damper 63 is pivotally movably mounted to a front portion of the head pipe 61 and a front portion of the top bridge 54; the steering damper 63 is disposed between the top bridge 54 and the bottom bridge 56 on the side of the top bridge 54; the light unit 68 is disposed downwardly of the steering damper 63 and between the top bridge 54 and the bottom bridge 56 on the side of the bottom bridge 56; and a portion forward of an area from the top bridge 54 to the bottom bridge 56 is covered with the number plate 15 (a cross section thereof is shown in FIG. 4).

The light unit 68 is mounted to the number plate 15 and exposed forwardly of the vehicle 10 through a window 15a formed in the number plate 15.

The light unit 68 has an optical axis (that coincides with an axis of an electric bulb) 68A inclined at an illumination angle α relative to a horizontal line 70.

Assume, for example, a case, in which the light unit 68 is disposed further upwardly, for example, at a position of the steering damper 63. In this case, if the road surface a predetermined distance forward of the vehicle 10 is illuminated with the light unit 68, the illumination angle involved becomes greater than the above-referenced illumination angle α. This results in a smaller longitudinal illumination range on the road surface. In accordance with the embodiment of the present invention, on the other hand, the light unit 68 is disposed to a lower level, so that the illumination angle α is even closer to the horizontal line 70. This allows the longitudinal illumination range on the road surface to be made greater.

The steering damper 63 has a proximal end fitted to the head pipe 61 and a distal end fitted to the top bridge 54. The proximal end of the steering damper 63 is disposed closer to a side of the head pipe 61 than the distal end thereof. Accordingly, the steering damper 63 is mounted substantially perpendicularly as compared with the head pipe 61 that is inclined relative to a perpendicular direction. Consequently, the proximal end of the steering damper 63 attached to the head pipe 61 protrudes forwardly only a small amount. This allows the number plate 15 to be disposed even closer to the side of the head pipe 61, contributing to a compactly built front portion of the vehicle 10.

Figure 5:
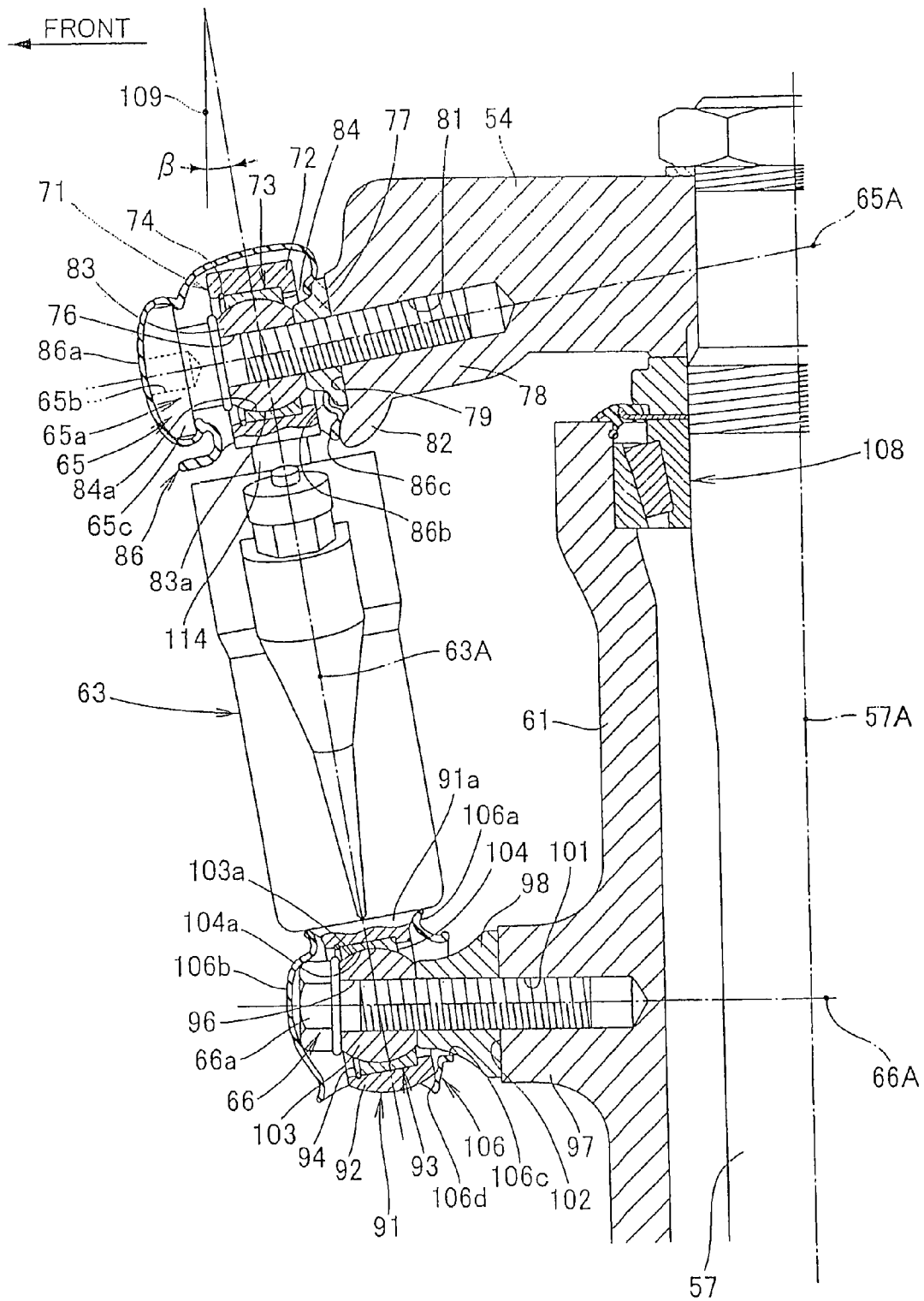
FIG. 5 is a cross-sectional view showing a steering damper mounting structure according to the embodiment of the present invention.

FIG. 5 is a cross-sectional view (partly side elevational view) showing a steering damper mounting structure according to the embodiment of the present invention. An upper mounting portion 71 for the steering damper 63 mounted on the top bridge 54 includes an upper annular portion 72, a spherical plain bearing 73, and a snap ring 74. The spherical plain bearing 73 is fitted into the upper annular portion 72. The snap ring 74 secures the spherical plain bearing 73 to the upper annular portion 72. The upper mounting portion 71 is mounted via a collar 77 to an upper mounting portion 78 formed in the top bridge 54 with the bolt 65 passed through a bolt insertion hole 76 formed in the spherical plain bearing 73. FIG. 5 also illustrates, a mounting surface 79 formed on an end of the upper mounting portion 78, internal threads 81 formed in the upper mounting portion 78, in which the bolt 65 is screwed, and a protrusion 82 (to be described in detail later) formed on a lower portion on the end of the upper mounting portion 78 The protrusion 82 prevents erroneous installation of the steering damper 63.

The spherical plain bearing 73 includes an inner race 83 and an outer race 84. The inner race 83 has an outer surface 83a, on which part of a convex spherical surface is formed. The outer race 84 has an inner surface 84a, on which part of a concave spherical surface slidably fitted over the outer surface 83a of the inner race 83 is formed. The inner race 83 includes the bolt insertion hole 76, while the outer race 84 is fitted in the upper annular portion 72.

The upper mounting portion 71, a head 65a of the bolt 65, and part of the collar 77 are covered with an upper boot 86 formed of rubber. In FIG. 5, reference numeral 65b represents a hexagon socket formed in the head 65a. Reference numeral 65c represents a large-diameter portion formed in the head 65a.

The upper boot 86 includes a bolt fitting portion 86a, a collar fitting portion 86b, and an opening 86c. The bolt fitting portion 86a is fitted over the large-diameter portion 65c of the bolt 65. The collar fitting portion 86b is fitted to the collar 77. The opening 86c is for draining water. The upper boot 86 protects the upper mounting portion 71 from rainwater, dust, and the like. Rainwater entering the upper boot 86 is drained through the opening 86c.

A lower mounting portion 91 of the steering damper 63 is mounted to the head pipe 61. The lower mounting portion 91 includes a lower annular portion 92, a spherical plain bearing 93, and a snap ring 94. The spherical plain bearing 93 is fitted into the lower annular portion 92. The snap ring 94 secures the spherical plain bearing 93 to the lower annular portion 92. The lower mounting portion 91 is mounted via a collar 98 to a lower mounting portion 97 formed in the head pipe 61 with the bolt 66 passed through a bolt insertion hole 96 formed in the spherical plain bearing 93. FIG. 5 also shows internal threads 101 formed in the lower mounting portion 97, in which the bolt 66 is screwed, and a mounting surface 102 formed on the lower mounting portion 97.

The spherical plain bearing 93 includes an inner race 103 and an outer race 104. The inner race 103 has an outer surface 103a, on which part of a convex spherical surface is formed. The outer race 104 has an inner surface 104a, on which part of a concave spherical surface slidably fitted over the outer surface 103a of the inner race 103 is formed. The inner race 103 includes the bolt insertion hole 96, while the outer race 104 is fitted in the lower annular portion 92.

The lower mounting portion 91, a head 66a of the bolt 66, and part of the collar 98 are covered with a lower boot 106 formed of rubber.

The lower boot 106 includes a base fitting portion 106a, a head abutment portion 106b, a side opening 106c, and a lower opening 106d. The base fitting portion 106a is fitted over a base portion 91a of the lower mounting portion 91. The head abutment portion 106b abuts on the head 66a of the bolt 66. The side opening 106c opens so as to circumvent the collar 98. The lower opening 106d disposed at a lower portion is for draining water. The lower boot 106 protects the lower mounting portion 91 from rainwater, dust, and the like. Rainwater entering the lower boot 106 is drained through the lower opening 106d.

Referring to FIG. 5, reference numeral 108 denotes a taper roller bearing disposed between the steering stem 57 and the head pipe 61.

When a handlebar steering angle is zero, an axis 63A of the steering damper 63 is inclined by an angle β relative to a straight line 109 that extends in parallel with an axis 57A of the steering stem 57 (and the head pipe 61) in a side view. Specifically, the axis 63A is inclined by the angle β relative to the axis 57A.

This represents the above-described arrangement, in which the lower mounting portion 91 of the steering damper 63 is disposed closer to a side of the axis 57A than the upper mounting portion 71.

As described heretofore, the axis 63A of the steering damper 63 is inclined relative to the axis 57A and, moreover, the mounting surface 79 on the side of the upper mounting portion 71 extends in parallel with the axis 63A in the side view when the handlebar steering angle is zero. This makes greater a swingable range of the spherical plain bearing 73 in the upper mounting portion 71. FIG. 5 also illustrates an axis 65A of the bolt 65 and an axis 66A of the bolt 66.

Figure 6:
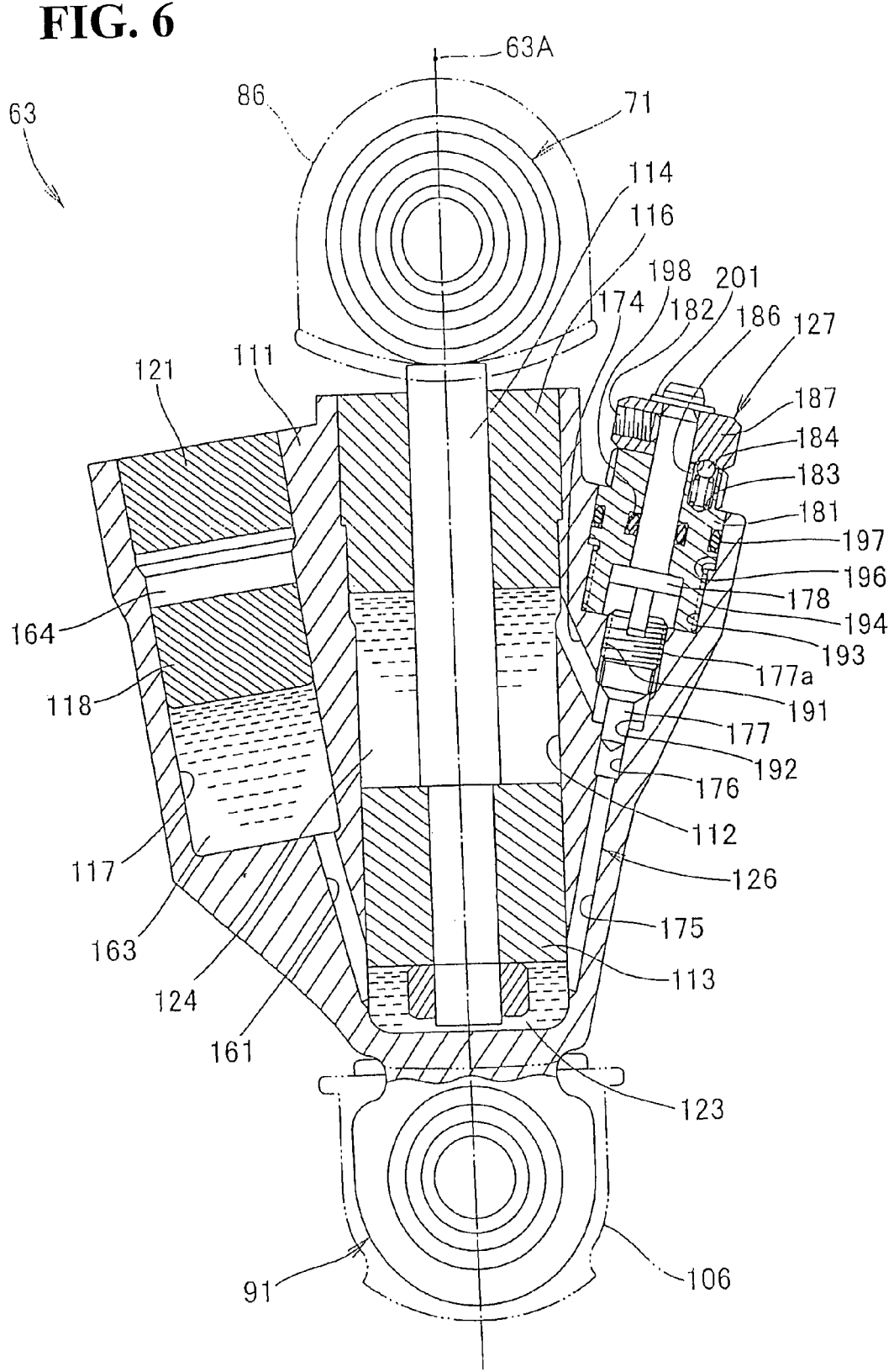
FIG. 6 is a cross-sectional view showing the steering damper according to the embodiment of the present invention.

FIG. 6 is a cross-sectional view showing the steering damper 63 according to the embodiment of the present invention. The steering damper 63 includes a body 111, a piston 113, a piston rod 114, the upper mounting portion 71, a first cylinder end hermetic sealing portion 116, a free piston 118, a second cylinder end hermetic sealing portion 121, and a flow rate adjustment mechanism 127. The body 111 includes a plurality of tubes. The piston 113 is movably inserted in a first cylinder hole 112 formed in the body 111. The piston rod 114 is attached to the piston 113. The upper mounting portion 71 is mounted to a leading end of the piston rod 114. The first cylinder end hermetic sealing portion 116 is fitted slidably in the piston rod 114 and closes an opening of the first cylinder hole 112. The free piston 118 is movably inserted in a second cylinder hole 117 formed in the body 111. The second cylinder end hermetic sealing portion 121 closes an opening of the second cylinder hole 117. The flow rate adjustment mechanism 127 varies a damping force of the steering damper 63 by adjusting a flow rate of a hydraulic fluid flowing through a communication path 126 that provides fluid communication between a first hydraulic chamber 123 and a second hydraulic chamber 124 formed on either side of the piston 113 in the first cylinder hole 112. The lower mounting portion 91 is integrally formed with a lower end of the body 111.

FIG. 6 also shows a communication hole 161 providing communication between the first cylinder hole 112 and the second cylinder hole 117, and a first chamber 163 and a second chamber 164, respectively, formed on either side of the free piston 118.

The above-referenced first hydraulic chamber 123, the second hydraulic chamber 124, and the first chamber 163 are filled with hydraulic fluid, while the second chamber 164 is filled with air.

The flow rate adjustment mechanism 127 includes a needle 177, an adjustment shaft 178, a shaft support member 181, and an adjustment knob 187. It is to be noted herein that the communication path 126 includes an upper communication hole 174 and a lower communication hole 175. To describe the flow rate adjustment mechanism 127 more specifically, the needle 177 advances into, or retracts from, a flow rate adjustment hole 176 formed at an upper end of the lower communication hole 175. The adjustment shaft 178 is connected to an end of the needle 177. The shaft support member 181 is mounted in the body 111 for rotatably supporting the adjustment shaft 178. The adjustment knob 187 is mounted to an end of the adjustment shaft 178 with a screw 182. The adjustment knob 187 can be stopped at every predetermined angle relative to the shaft support member 181 when a ball 184 pressed by a spring 183 fits into a specific one of a plurality of indentations 186, each being formed circumferentially at every predetermined angle.

Referring to FIG. 6, reference numeral 191 denotes internal threads formed in a lower longitudinal hole 192 in the body 111. The internal threads 191 are threadedly connected to external threads 177a formed on the needle 177. Internal threads 193 are formed in an upper longitudinal hole 196 in the body 111. The internal threads 193 are threadedly connected to external threads 194 formed on the shaft support member 181. An O-ring 197 is fitted to an outer peripheral portion of the shaft support member 181. An O-ring 198 is mounted in an inner peripheral portion of the shaft support member 181. A retaining ring 201 prevents the adjustment knob 187 from coming off from the adjustment shaft 178.

Turning the adjustment knob 187 rotates the needle 177 via the adjustment shaft 178. Turning the adjustment knob 187 also causes the needle 177 to advance into, or retract from, the flow rate adjustment hole 176 through the internal threads 191 and the external threads 177a threadedly connected thereto.

The flow rate adjustment hole 176 is a female taper hole, while the needle 177 has a leading end that is a male taper to be engaged with the flow rate adjustment hole 176.

As the leading end of the needle 177 advances into the flow rate adjustment hole 176, a cross-sectional area of the hydraulic fluid path becomes small, reducing the flow rate of the hydraulic fluid. When the leading end of the needle 177 retracts from the flow rate adjustment hole 176, the cross-sectional area of the hydraulic fluid path becomes large, increasing the flow rate of the hydraulic fluid.

Operation of the protrusion 82 for preventing erroneous installation of the steering damper 63 described heretofore will be described below.

Figure 7:
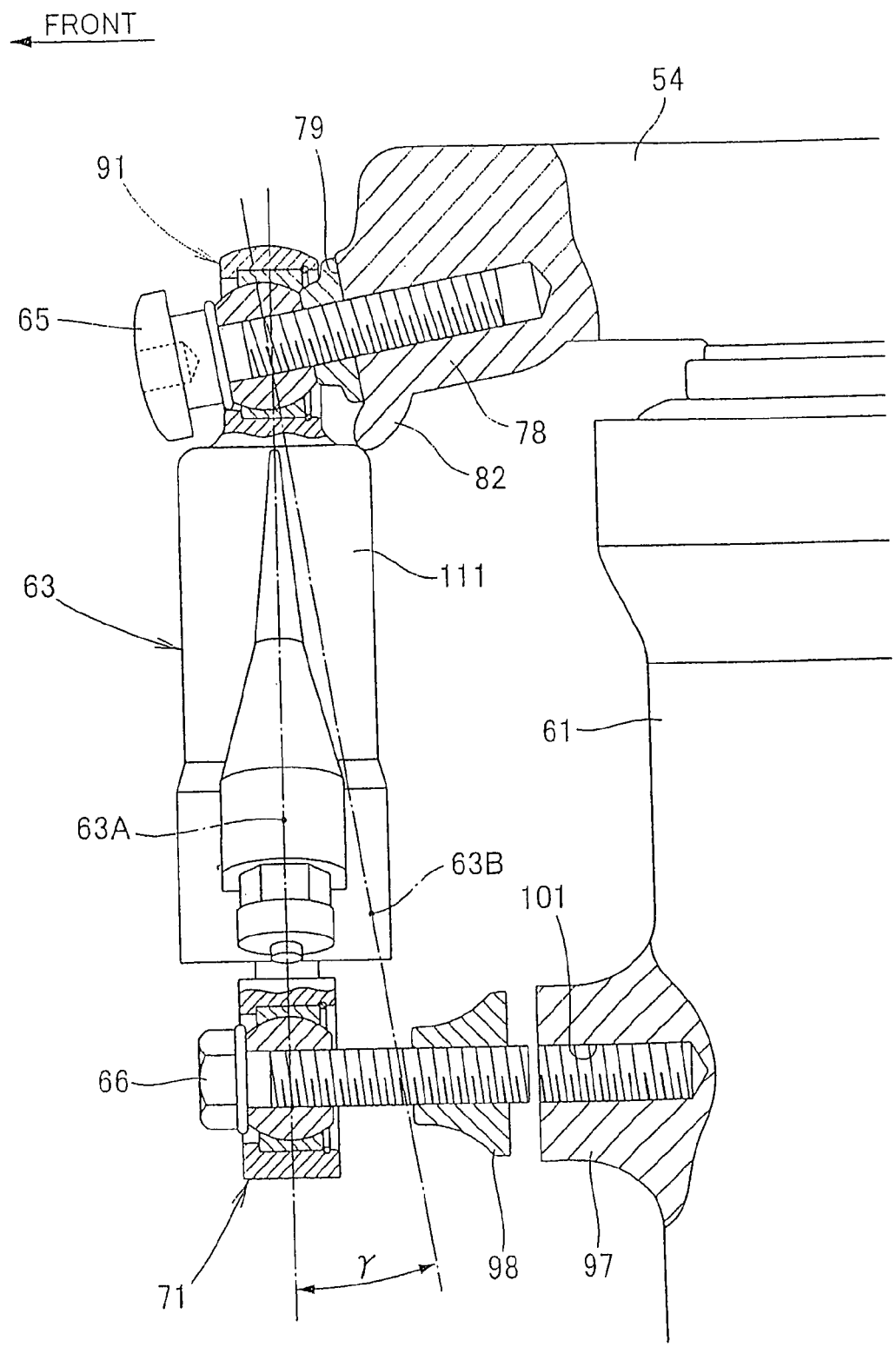
FIG. 7 is a view for illustrating the operation of a protrusion for preventing erroneous installation of the steering damper according to the embodiment of the present invention.

FIG. 7 is a view for illustrating the operation of the protrusion 82 for preventing erroneous installation of the steering damper 63 according to the embodiment of the present invention.

If, for example, the lower mounting portion 91 of the steering damper 63 is mistakenly mounted to the top bridge 54 with the bolt 65, the protrusion 82 contacts a portion of the body 111 of the steering damper 63 close to the lower mounting portion 91. This prevents the steering damper 63 from being inclined further toward the side of the head pipe 61. Specifically, the axis 63A of the steering damper 63 is inclined less by an angle γ relative to an axis 63B during correct installation.

Consequently, a further attempt will fail, in which the bolt 66 is passed through the upper mounting portion 71 of the steering damper 63 and the bolt 66 is screwed into the internal threads 101 in the head pipe 61. This is because the bolt 66 does not reach the internal threads 101, defying further assembly steps.

More specifically, if the lower mounting portion 91 of the steering damper 63 is mounted to the top bridge 54, or the upper mounting portion 71 of the steering damper 63 is mounted to the head pipe 61, the protrusion 82 contacts the body 111, so that the other mounting portion of the steering damper 63, that is, the upper mounting portion 71 or the lower mounting portion 91, cannot be mounted. As such, erroneous installation of the steering damper 63 can be prevented.

FIG. 8 is a view for illustrating a pivotal movement of the steering damper 63 according to the embodiment of the present invention. FIG. 8 is a bottom view showing the steering damper 63 and the top bridge 54 as viewed from a lower end side of the head pipe 61.

FIG. 8 shows that the top bridge 54 rotates from a position of zero steering angles as shown by an imaginary line to a position of a steering angle θ as shown by a solid line. FIG. 8 further shows that, as a result of the foregoing rotation of the top bridge 54, the steering damper 63 pivotally moves about the lower mounting portion 91, causing the upper mounting portion 71 to move arcuately as shown by an arrow.

FIGS. 9(a) through 9(d) are views showing schematically mounting positions on, and pivotally moved postures of, both ends of the steering damper 63. FIG. 9(a) is a side elevational view showing the embodiment of the present invention. FIG. 9(b) is a bottom view of FIG. 9(a). FIG. 9(c) is a side elevational view showing a comparative embodiment of the present invention. FIG. 9(d) is a bottom view of FIG. 9(c).

Referring to FIG. 9(a) showing the embodiment of the present invention, assume that a distance between the axis 57A and the lower mounting portion 91 (indicated by a black dot) of the steering damper 63 is R1, a distance between the axis 57A and the upper mounting portion 71 (indicated by a blank dot) of the steering damper 63 is R2 (R2>R1), and a distance between the upper mounting portion 71 and the lower mounting portion 91, that is, a distance between the mounting portions, is L1.

Referring to FIG. 9(b) showing the embodiment of the present invention, the steering damper 63 (the steering damper 63 is shown by a broad solid line; the same applies hereunder) gradually pivotally moves, through a steering action, about the lower mounting portion 91 as shown by the arrow, causing the upper mounting portion 71 to move through the steering angle θ.

Referring to FIG. 9(c) showing the comparative embodiment of the present invention, a steering damper 201 extends in parallel with an axis 57A. Further, a distance between the axis 57A and an upper mounting portion 202 (indicated by a blank dot) of the steering damper 201 equals a distance between the axis 57A and a lower mounting portion 203 (indicated by a blank dot) of the steering damper 201, each being referred to as R2.

Further, assume that a distance between the upper mounting portion 202 and the lower mounting portion 203, that is, a distance between the mounting portions, is L2.

Referring to FIG. 9(d) showing the comparative embodiment of the present invention, the steering damper 201 gradually pivotally moves, through a steering action, about the lower mounting portion 203 as shown by the arrow, causing the upper mounting portion 202 to move through the steering angle θ.

Figure 10:
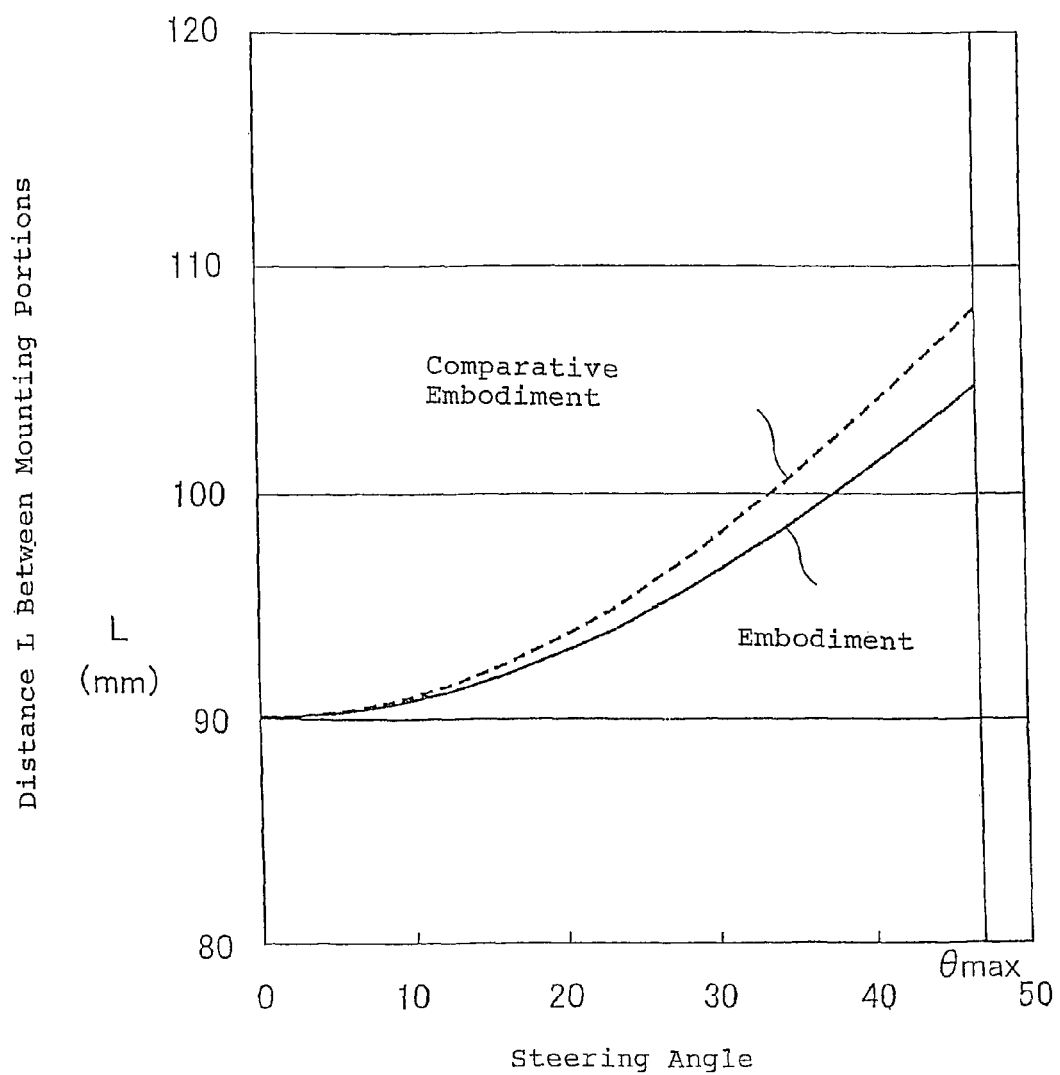
FIG. 10 is a graph showing changes in the distance between the mounting portions of the steering damper during the steering action according to the embodiments of the present invention.

FIG. 10 is a graph showing changes in the distance between the mounting portions of the steering damper during the steering action according to the embodiments of the present invention. On the graph shown in FIG. 10, the ordinate represents the distance L between the mounting portions of the steering damper, specifically, the distance between the upper and lower mounting portions, and the abscissa represents the steering angle θ.

Referring to FIGS. 9(a) through 9(d), assume, for example, that the distance R1 is 60 mm, the distance R2 is 75 mm, the distance between the mounting portions L1 of the embodiment is 90 mm, the distance between the mounting portions L2 of the comparative embodiment is 90 mm, and the maximum steering angle θmax is 47°. Changes in the distance between the mounting portions L (specifically, L1 and L2) at the steering angle θ changing from 0 through θmax° become greater as the steering angle θ increases, as shown by the solid line for the embodiment and the broken line for the comparative embodiment. Further, the distance between the mounting portions L2 of the comparative embodiment remains greater at all times than the distance between the mounting portions L1 of the embodiment.

Though not shown, changes in the distance between the mounting portions L (specifically, L1 and L2) at the steering angle θ changing from 0 through −θmax° are the same as above.

In the graph shown in FIG. 10, the ordinate represents a stroke of the steering damper from an initial state if 90 mm is subtracted from the distance between the mounting portions L at each steering angle θ. The stroke of the embodiment remains smaller than that of the comparative embodiment at all times, which promotes reduction in size of the steering damper of the embodiment.

As described above with reference to FIGS. 2 through 5, according to the first aspect of the present invention, there is provided a steering damper mounting structure of a vehicle. The vehicle 10 (see FIG. 1) includes the head pipe 61, the front fork 13, the fork bridge 53, and the steering damper 63. The head pipe 61 forms part of the vehicle body. The front fork 13, which suspends the front wheel, is steerably disposed on the head pipe 61. The fork bridge 53 connects the left member and the right member of the front fork 13. Further, the steering damper 63 is disposed on the fork bridge 53 and the head pipe 61. The steering damper 63 dampens a steering directional movement transmitted from the road surface to the handlebar 12 (see FIG. 1) via the front wheel and the front fork 13. In this steering damper mounting structure, the portion on the side of the head pipe 61 supporting the steering damper 63, specifically, the lower mounting portion 97 is disposed on the side of the axis 57A as the center of pivotal motion of the front fork 13 relative to the portion on the side of the fork bridge 53 supporting the steering damper 63, specifically, the upper mounting portion 78.

The foregoing arrangements result in the following. Specifically, as compared with the case, in which the steering damper 63 is disposed such that the axis 63A thereof extends in parallel with the axis 57A of the head pipe 61, protrusion of the entire steering damper 63 forward of the vehicle 10 can be suppressed and the space required for the steering damper 63 to rotate during steering becomes smaller. If, for example, a cover member (the number plate 15 or the like) covering the steering damper 63 is disposed around (including areas at the front and sides of) the steering damper 63, the cover member is not largely away from the head pipe 61, thus promoting reduction in size of the front portion of the vehicle. Additionally, the smaller stroke of the steering damper 63 contributes to a smaller steering damper 63.

According to the second aspect of the present invention, the mounting surface 79 disposed on the fork bridge 53 for mounting the steering damper 63 on the fork bridge 53 is formed to be in parallel with the axis 63A of the steering damper 63 when the handlebar steering angle is zero.

Accordingly, the pivotal motion range of the steering damper 63 can be made even greater. The aspect of the present invention can therefore respond to a vehicle involving a large steering angle.

Referring to FIGS. 5 and 6, according to the third aspect of the present invention, the steering damper 63 includes the body 111 as the main body having the first cylinder hole 112 as the cylinder, the piston 113 movably inserted in the first cylinder hole 112, and the piston rod 114 as the rod disposed on the piston 113. Further, the body 111 is supported on the head pipe 61 and the piston rod 114 is supported on the fork bridge 53.

Specifically, the piston rod 114, which is lighter in weight than the body 111 accommodating the piston 113, is supported on the fork bridge 53. This arrangement helps make small the inertia force generated in the piston rod 114 during rotation of the fork bridge 53, contributing to an improved steering feel felt via the handlebar 12.

According to the fourth aspect of the present invention, the fork bridge 53 includes the protrusion 82 that contacts the body 111 to thereby prevent erroneous installation, in which the steering damper 63 is installed invertedly between the head pipe 61 and the fork bridge 53.

The protrusion 82 comes in contact with the body 111 if the body 111 of the steering damper 63 is mounted to the fork bridge 53 or the piston rod 114 of the steering damper 63 is mounted to the head pipe 61. Erroneous installation can thus be prevented with such a simple structure.

The steering damper mounting structure of the vehicle according to the present invention is ideally applicable to a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering damper mounting structure of a vehicle, the vehicle comprising:
a head pipe forming part of a vehicle body;
a front fork steerably disposed on the head pipe, the front fork for suspending a front wheel;
a fork bridge connecting a left member and a right member of the front fork; and
a steering damper disposed on the front fork and the head pipe, the steering damper for dampening a steering directional movement transmitted from a road surface to a handlebar via the front wheel and the front fork,
wherein the steering damper is supported by a lower mounting portion on a side of the head pipe and an upper mounting portion on a substantially vertical side of the fork bridge,
wherein a longitudinal axis of the steering damper is inclined by an angle greater than 0° relative to a longitudinal axis of the head pipe regardless of a steering position of the front fork.

2. The steering damper mounting structure according to claim 1, wherein a mounting surface disposed on the fork bridge for mounting the steering damper on the fork bridge is formed to be in parallel with the longitudinal axis of the steering damper when a handlebar steering angle is zero.

3. The steering damper mounting structure according to claim 2,
wherein the steering damper includes a main body having a cylinder, a piston movably inserted in the cylinder, and a rod disposed on the piston; and
wherein the main body is supported on the head pipe and the rod is supported on the fork bridge.

4. The steering damper mounting structure according to claim 3,
wherein the fork bridge includes a protrusion that contacts the main body to thereby prevent erroneous installation, in which the steering damper is installed invertedly between the head pipe and the fork bridge.

5. The steering damper mounting structure according to claim 1,
wherein the steering damper includes a main body having a cylinder, a piston movably inserted in the cylinder, and a rod disposed on the piston; and
wherein the main body is supported on the head pipe and the rod is supported on the fork bridge.

6. The steering damper mounting structure according to claim 5, further comprising a protrusion extending downwardly and forwardly from a front side of the fork bridge, and if the lower mounting portion of the steering damper is erroneously mounted to the fork bridge, the protrusion prevents the upper mounting portion of the steering damper from being mounted to the head pipe.

7. The steering damper mounting structure according to claim 1,
wherein the front fork includes a top bridge and a bottom bridge, and the steering damper is pivotally movably mounted to a front portion of the head pipe and a front portion of the top bridge in a position that is between the top bridge and the bottom bridge.

8. The steering damper mounting structure according to claim 1, wherein the steering damper is mounted above a head light of the vehicle.

9. The steering damper mounting structure according to claim 1, wherein a proximal end of the steering damper is disposed closer to the side of the head pipe than a distal end thereof.

10. A steering damper mounting structure of a vehicle, the vehicle comprising:
a head pipe forming part of a vehicle body;
a front fork steerably disposed on the head pipe, the front fork for suspending a front wheel;
a fork bridge connecting a left member and a right member of the front fork; and
a steering damper disposed on the front fork and the head pipe, the steering damper for dampening a steering directional movement transmitted from a road surface to a handlebar via the front wheel and the front fork,
wherein the steering damper is supported by a lower mounting portion on a side of the head pipe and an upper mounting portion on a substantially vertical side of the fork bridge,
wherein the fork bridge includes a protrusion which contacts a main body of the steering damper to thereby prevent erroneous installation, in which the steering damper is installed invertedly between the head pipe and the fork bridge.

11. A steering damper mounting structure of a vehicle, the vehicle comprising:
a head pipe forming part of a vehicle body;
a front fork steerably disposed on the head pipe, the front fork for suspending a front wheel;
a fork bridge connecting a left member and a right member of the front fork; and
a steering damper disposed on the front fork and the head pipe, the steering damper for dampening a steering directional movement transmitted from a road surface to a handlebar via the front wheel and the front fork,
wherein the steering damper is supported by a lower mounting portion on a side of the head pipe and an upper mounting portion on a substantially vertical side of the fork bridge,
wherein longitudinal axes of the steering damper and the head pipe are arranged so as to be not parallel to each other even when the front fork is positioned at a center of pivotable motion.

12. The steering damper mounting structure according to claim 11, wherein a mounting surface disposed on the fork bridge for mounting the steering damper on the fork bridge is formed to be in parallel with the longitudinal axis of the steering damper when a handlebar steering angle is zero.

13. The steering damper mounting structure according to claim 12,
wherein the steering damper includes a main body having a cylinder, a piston movably inserted in the cylinder, and a rod disposed on the piston; and
wherein the main body is supported on the head pipe and the rod is supported on the fork bridge.

14. The steering damper mounting structure according to claim 13,
wherein the fork bridge includes a protrusion that contacts the main body to thereby prevent erroneous installation, in which the steering damper is installed invertedly between the head pipe and the fork bridge.

15. The steering damper mounting structure according to claim 11,
wherein the steering damper includes a main body having a cylinder, a piston movably inserted in the cylinder, and a rod disposed on the piston; and
wherein the main body is supported on the head pipe and the rod is supported on the fork bridge.

16. The steering damper mounting structure according to claim 15,
wherein the fork bridge includes a protrusion which contacts the main body to thereby prevent erroneous installation, in which the steering damper is installed invertedly between the head pipe and the fork bridge.

17. The steering damper mounting structure according to claim 15, further comprising a protrusion extending downwardly and forwardly from a front side of the fork bridge, and if the lower mounting portion of the steering damper is erroneously mounted to the fork bridge, the protrusion prevents the upper mounting portion of the steering damper from being mounted to the head pipe.

18. The steering damper mounting structure according to claim 11,
wherein the front fork includes a top bridge and a bottom bridge, and the steering damper is pivotally movably mounted to a front portion of the head pipe and a front portion of the top bridge in a position that is between the top bridge and the bottom bridge.

19. The steering damper mounting structure according to claim 11, wherein the steering damper is mounted above a head light of the vehicle.

20. The steering damper mounting structure according to claim 11, wherein a proximal end of the steering damper is disposed closer to the side of the head pipe than a distal end thereof.

* * * * *